F389D OR 3,796,829

United States
Gray

[11] 3,796,829
[45] Mar. 12, 1974

[54] CLOSED TELEVISION NETWORK WITH AN OPEN TELEVISION SYSTEM AND A CLOSED TELEVISION SYSTEM

[75] Inventor: Robert G. Gray, Levittown, Pa.

[73] Assignee: Athena Communications Corporation, New York, N.Y.

[22] Filed: Feb. 10, 1972

[21] Appl. No.: 225,031

[52] U.S. Cl. .......... 178/DIG. 13, 325/308
[51] Int. Cl. .......... H04n 7/00
[58] Field of Search .......... 178/DIG. 13; 325/308

[56] References Cited

UNITED STATES PATENTS

| | | | |
|---|---|---|---|
| 3,366,731 | 1/1968 | Wallerstein | 325/308 |
| 3,581,209 | 5/1971 | Zimmerman et al. | 325/308 |
| 3,594,496 | 7/1971 | Gabriel | 178/DIG. 13 |
| 3,643,164 | 2/1972 | Sly et al. | 325/308 |
| 3,684,823 | 8/1972 | Mcvoy | 178/5.1 |
| 3,693,090 | 9/1972 | Gabriel | 325/308 |
| 3,105,873 | 10/1963 | Winston et al. | 178/DIG. 13 |

OTHER PUBLICATIONS

"Two-way Applications for Cable Television Systems in the '70s"–IEE Spectrum, Nov. 1971, pg. 49, 53.

*Primary Examiner*—Paul J. Henon
*Assistant Examiner*—Mark Edward Nusbaum
*Attorney, Agent, or Firm*—Kenneth E. Merklen

[57] ABSTRACT

A closed television (TV) network includes an off-air open TV system providing TV signals with programs broadcast to the general public and a closed-circuit or private TV system providing in-house or other closed-circuit programs. The open TV system provides off-air TV signals with programs broadcast to the general public to the TV receiver in the closed network for normal, unrestricted use. The closed-circuit TV system provides private or closed-circuit programs over the same closed TV network with central, controlled use by the TV receivers in the closed TV network. Central control over the closed-circuit program is maintained over the individual TV receivers in the network with permissive-selective viewing of the closed-circuit program with non-restricted selective viewing of the off-air programs.

34 Claims, 2 Drawing Figures

ROBERT G. GRAY
INVENTOR

ROBERT G. GRAY
INVENTOR

CLOSED TELEVISION NETWORK WITH AN OPEN TELEVISION SYSTEM AND A CLOSED TELEVISION SYSTEM

The present invention relates to television (TV) networks comprising two or more TV systems, one TV system being what is referred to as an "open" TV system and another TV system being referred to as a "closed" TV system, which are integrated into the TV network. More particularly, the TV network is a "closed" TV network supplying TV signals to a plurality of TV receivers via a TV signals distribution network. The closed TV network of the present invention may easily be incorporated in a system in a hotel or motel or hospital or other closed or confined facility which has a plurality of TV receivers, a TV signal distribution network coupled to each of the TV receivers and a source of TV signals coupled to the TV signals distribution network. The TV network of the present invention includes at least one open TV system, which provides TV signals to the distribution network for applying the TV signals to the TV receivers of the TV network for unmonitored and unsupervised selective viewing of the TV programs, and at least one closed TV system, which provides TV signals to the distribution network with central monitoring and control over the selection made to view the TV programs defined by the TV signals provided over the closed TV system.

The "open" TV system of the closed TV network includes a means for picking up TV signals broadcast, or generally available to the general public. The pick up means may be a master antenna system or other antenna array for picking up off-air TV signals broadcast to the general public or may be "head-end" TV apparatus connected to the TV broadcast studio for direct pick up of TV signals or any other means of collecting a plurality of TV signals generally available to the public.

The TV signals so picked up or collected by the pick up means are applied to the TV signals distribution network of the TV network for conducting the TV signals to each of the TV receivers in the TV network. This provides a selective open TV system limited only by the TV signals available to the public.

The TV signals distribution network may be a wire or solid link or an air link capable of conducting TV and other radio frequency (RF) signals between the TV signals pick up means and each of the TV receivers in the closed TV network In a TV network in a hotel, motel, hospital, educational institution or other such facility, a wire or solid link TV signals distribution network may be found most practical and economical, however, other forms and combinations of linking network may be used, if desired.

The "closed" TV system of the closed TV network may be considered a closed circuit TV system which is integrated into the closed TV network. The closed TV system includes a source of TV signals and a means for changing, encoding or modulating the TV signals prior to application of the TV signals to the TV signals distribution network. As part of the closed TV system, a means for re-changing or changing again, decoding or converting the changed, encoded or modulated TV signals is provided. The re-changing means is individual to each TV receiver in the TV network and each re-changing means is individually controlled by operation of central control and monitoring apparatus in coordination with actuation, at the local level, of a room control device, by the operator of the TV receiver. This provides a permissive-selective closed TV system.

The closed TV system signals are altered or changed or modulated prior to being applied to the TV signals distribution network so that the closed TV system TV signals will not interfere with the TV signals applied to the distribution network by the open TV system. Another reason for such change in the TV signals is to prevent detection of the program defined by such TV signals by the TV receivers without the TV signals being re-altered, rechanged, decoded or converted.

The source of the TV signals of the closed TV system may be a TV camera producing TV signals defining a TV program different from the programs received over the "open" TV system, or may be a video tape recorder used in playback function from which a TV program such as a movie may be generated or any other closed circuit TV program arrangement. The means for changing, encoding or modulating the TV signal may be any means of changing, encoding, altering or modulating the TV signal without destroying the TV program defined by the TV signal and which changed, encoded, altered or modulated TV signal may be re-changed, decoded, re-altered or converted or otherwise re-modulated so that this re-changed, decoded, re-altered or converted TV signal may be detected by a normal TV receiver and the TV program defined by the TV signals may be intelligently displayed on the screen of the TV receiver.

As part of the closed TV system, each TV receiver has associated therewith a means for re-changing, decoding, re-altering, converting or demodulating (hereinafter referred to as a means for converting or "converter") the closed TV system TV signal received from the TV signals distribution network. Each converter is individually cooperatively controlled both centrally through the operation of a central control and monitoring apparatus and by actuation of a room control device, locally.

Part of the TV network is a TV and RF signals switching means which is individual to each receiver in the TV network and operated at the receiver level. The switching means may be any TV and/or RF signal switching device, which is connected to and receives TV and/or RF signals from the TV signals distribution network, and applies such signals substantially directly to the antenna terminals of the associated TV receiver or, when actuated, applies such signals to the converter, receives the converted TV signals from the converter and applies the converted TV signals to the associated TV receiver antenna terminals.

The means for changing, encoding, altering or modulating the TV signals generated by the closed TV system (hereinafter referred to as means for modulating or "modulator") is preadjusted to modulate the closed TV system signals so that the modulated TV signals will not interfere with other signals applied to the TV signals distribution network, and so that the TV program defined by the TV signals, in their modulated form, will not be detected and/or intelligently displayed by a normal TV receiver. Each converter as preadjusted to convert the modulated TV signals and to condition the converted TV signals so that the associated TV receiver will detect the TV signal and will display the program defined by the TV signal.

In an expanded form of the invention, the closed TV system may include more than one closed-circuit TV program generating means. For example, one closed-circuit TV program may be an in-house TV program, generated locally by a video tape play-back recorder while another closed-circuit TV program may be generated remotely from another closed-circuit or private TV program source. Each closed circuit TV program would include its own modulator, each of which would provide a modulated TV signal different or distinguishable from other closed-circuit modulated TV signals applied to the same closed TV network so that individual converting of the TV signals may be accomplished to obtain separation of the individual TV programs therein defined.

Selection to view the open TV system programs or the closed TV system programs provided over the closed TV network is made at the receiver level of the network. This selection is made by the "guest" using the TV receiver. However, intelligable reception of the TV programs of the closed TV system is a function of actuation of the converter.

Actuation of the converter is under permissive control at the central control level and requires an overt act on the part of the guest by actively actuating the room control device at the TV receiver in the closed TV network.

The closed TV network further includes a central monitor and control panel with switching means and indicator means individual to each receiver in the TV network. Each TV receiver has associated therewith a control device, herein referred to as a "Room Control." Each Room Control unit includes a converter such as a TV signal converter, for example, a radio frequency (RF) switching means. The TV signals distribution network of the closed TV network is connected to the RF switching means and the RF switch means is connected to the converter and to the TV receiver. With the RF switching means in one position, the TV signals on the TV signal distribution network from the open TV system and from the closed TV system are applied via the RF switch to the TV receiver. In the other position, an actuated position, all such TV signals are applied via the switch to the converter and then from the converter to the TV receiver.

When the TV signals on the distribution network are applied directly to the antenna terminals of the TV receiver, the TV receiver will detect and display only those TV signals from the open TV system. When the TV signals are applied to the converter and then to the antenna terminals of the TV receiver, the TV receiver will detect and display the TV signals from the closed TV system. Routing of the TV signals via the RF switching means is under control of the operator of the TV receiver at the room level.

Energization of the room control device is controlled by a control and indicating unit at the central monitor and control panel, while actuation of the room control device is accomplished at the TV receiver level. Connection between the central monitor and control panel and the room control device provided a means for conditioning the room control unit for actuation, indicating at the TV receiver level, that the room control device is in condition for actuation and indicating at the central control level that the room control unit is in an energizing condition, after the device has been actuated.

With controlled and monitored use of a closed TV system in a closed TV network, the closed TV system may be programmed to commence at the predetermined time, and selected TV entertainment may be provided over the closed TV system, such as a movie for example. Prior to showing of the selected entertainment over the closed TV system, the room control devices may be conditioned for actuation at the central control level and, if the guest wishes to see the entertainment or program on the closed TV system, he may do so by actuating the room control device. If the guest chooses not to see the entertainment or program on the closed TV system, he may, if he so desires, watch the TV program provided by the open TV system. The monitoring capability of the closed TV network will indicate at the central level which of the room control devices are energized and thus it can be determined in which room or rooms the entertainment on the closed TV system is being shown.

The principles and functions of the invention having been broadly described, it will be seen that the use of a closed TV network may be very broad. The commercial aspects of the invention may be especially attractive to hotels and/or motels for example, may be exploited by using the novel TV network to show pay-to-view TV programs. The central monitoring capability will inform the management of the hotel or motel what room or rooms are watching the closed TV program and the selective actuation capability provides the choice or selection feature for the guest. The system may also be used in hospitals, for example, where patients may selected to view the closed circuit TV program and where the administration may charge for such use.

The system could also be used by education institutions and may include on campus and/or off-campus extentions of the network. The closed TV system may include TV programs of lectures and/or other classroom activity and/or instruction. Students who are, for one reason or other, outside the classroom or lecture hall may watch the proceedings over the closed TV system and the administration of the institution will be able, through the monitoring capabilities, to tell where the particular closed TV program is being viewed.

It is, therefore, an object of the present invention to provide a television network in which an open television system provides television signals broadcast to the general public to a common conductor of television signals and a closed television system provides closed circuit television signals to the same common conductor with selection between the television system signals being made at the receiver level but controlled at a control point in the network.

Another object is to provide a television network in which two dissimilar television systems apply television program signals to the same signal carrier network, the television signals of one television system differing from the other to the extent that a normal television receiver can display intelligently the television signals from one television system but is prevented from intelligently displaying television signals from the other television system without first having the television signals processed.

Another object is to provide a television network having an open television system and a closed television system applying their respective television signals to the same signal conductor network in which the television signals generated in the closed television system are modulated before the signals are applied to the signal conductor.

A further object is to provide a television network having an open television system and a closed television system applying their respective television signals to a common signal distribution network in which the television signals generated in the closed television system are modulated before the television signals are applied to the signal distribution network and in which the closed television system signals are converted before such signals are applied to a television receiver.

These and other objects will become apparent when reading the following detailed description of the invention, with reference to the accompanying drawings in which.

Figure 1:
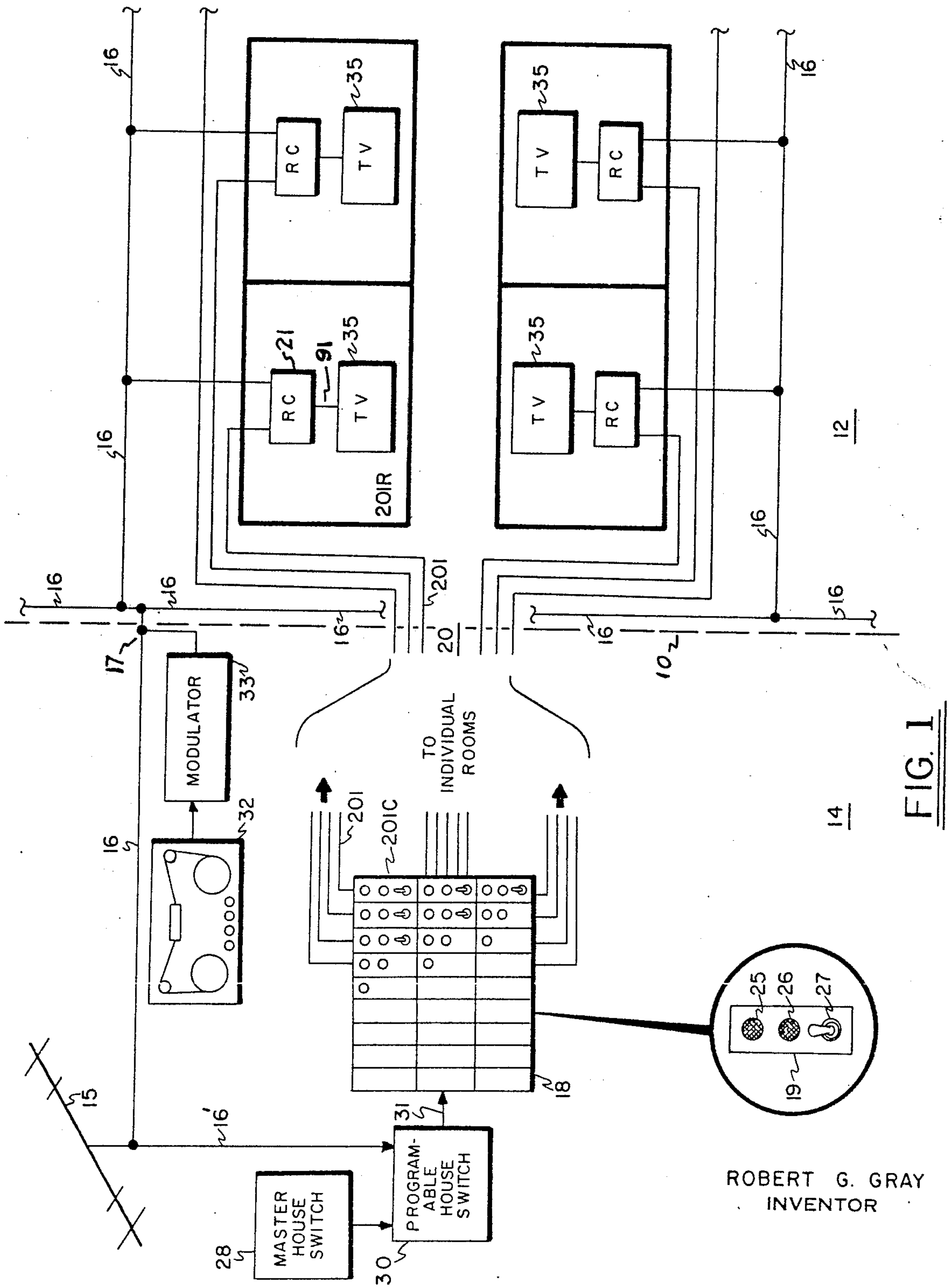
FIG. 1 is a block diagram of a closed TV network.

Referring to FIG. 1, generally the block diagram represents an in-house, closed TV network, such as the type that may be used in a hotel or motel or similar facility where there are a plurality of TV receivers in the rooms, suites or apartments and where the rooms, suites or apartments are essentially controlled or supervised by a central office or "desk." However, although the present system is represented and described with reference to an "in-house," closed TV network the present invention could be expanded and the principles of the invention could be used in an external closed television network, such as a master antenna system, a cable television system or any system where a common antenna array or head-end central transmitting unit is used to provide off-air TV signals or other TV signals broadcast to the general public to a plurality of TV receivers via an interlinking signal distribution network and into which the signals of a closed circuit or private circuit TV system may be interjected.

FIG. 1, in particular, represents a closed TV network incorporated into a hotel or motel, or other similar multi-unit facility (hereinafter referred to as a "house"). The broken line 10 represents that the network extends into two parts or sections of the house. The section to the right of the broken line 10 represents a section made up of living quarters, such as rooms, suites, or apartments, etc, normally occupied by tenants, roomers, or guests etc. The living quarters of the house are represented by four (4) representations of rooms, each of which has a TV receiver (TV) and a room control (RC) device. No limitations as to the number of rooms, suites or apartments is intended since the network may be extended to any reasonable number of units, limited only by the size of the network and then the number of positions on the house or central panel or console.

The section to the left of the broken line 10, section 14 represents the office or desk or house control or other supervisory area such as found in any hotel, motel, inn, resort or lodging place. Such central control area is hereinafter referred to as "office." As will be noted an antenna array, representing a means for picking up or receiving TV signals and delivering the same to a signal distribution network is represented at 15. The signal distribution network is represented by a network of leads 16 which connects the open TV program signal source to the individual rooms. As is well known in the art, an antenna array, such as a master antenna, for example, may provide off-air TV signals to the TV receivers in the individual rooms so that each TV receiver may be selectively operated to show any of the TV programs presented over the air, from any off-air station or channel so picked up by the antenna.

In the office section 14, is a house or central control and monitoring panel or console 18, which includes control and indicating units, such as shown in enlarged view at 19, for each TV receiver in the network. Each control and indicating unit is associated with a room in the house. The house control panel 18 may include as many control and indicating units as there are rooms, or units of living quarters in the house, considering each living unit has a TV receiver therein.

The TV network of the present invention, as represented in FIG. 1, includes at least two individual TV systems. Some networks envisioned within the scope of the invention may include an AM/FM radio signal receiving system integrated into the closed TV network. Other networks may include more than two individual TV systems integrated into the network.

One of the TV systems of the closed TV network may be described as an off-air reception, or open TV system. This system may include an antenna arrangement or other means for receiving and providing TV signals for programs broadcast via some transmitting means to the general public, capable of being received and translated by a normal TV receiver. The off-air reception or open TV system is represented by an antenna 15 and leads 16, closed contacts 83 and 84 and lead 91, providing open TV signals to the TV receiver 35, shown particularly in FIG. 2.

Another of the TV systems in the closed TV network may be described as a closed circuit or priviate circuit TV system. This latter system may be closed circuit broadcast TV system or private circuit TV system, such as a locally operated video tape recorder or private TV studio or any other means for providing a closed circuit TV program. The closed circuit TV program signals are processed or modulated so that the particular signals may be applied to the common network carrying off-air TV signals to the TV receivers without interfering with the off-air TV signals, and further are so processed or modulated as to prevent normal reception by a normal TV receiver when applied directly to the TV receiver.

One way to modulate such a TV signal is by combining the TV program signal with a carrier frequency somewhat outside the normal spectrum of frequencies to which a normal TV receiver will respond.

The closed TV system of the closed TV network is represented by a video tape play back recorder 32, and modulator 33, generating TV program signals and applying such signals to the common TV signal distribution network 16. The closed TV system also includes the master house switch 28 and programmable house switch 30, the house or central control and monitoring panel 18 and the leads 20 coupling the individual house control and indicating units 19 to the control apparatus in the associated room. In order to provide selectivity in the TV network, a room control device is provided with each TV receiver which may, when enabled by central control operation, be actuated locally to operate a TV signal converter and RF switch means. The TV signal distribution network 16, the RF switch and the lead 91 are effectively part of both the open TV system and the closed TV system of the TV network.

The closed TV network may also include a second closed circuit TV system having TV program signals modulated still different from the TV program signals of the first mentioned closed TV system. Such a multiplexed TV network may be useful in educational institutions or educational or information systems operated over a closed TV network.

The various TV program signals and RF carriers may be applied to the lead 16 via an RF coupling at 17, for example.

If desired, AM/and/or FM radio signals may also be applied to the closed TV network by applying the signals to the lead 16 at the RF coupling 17.

Figure 2:
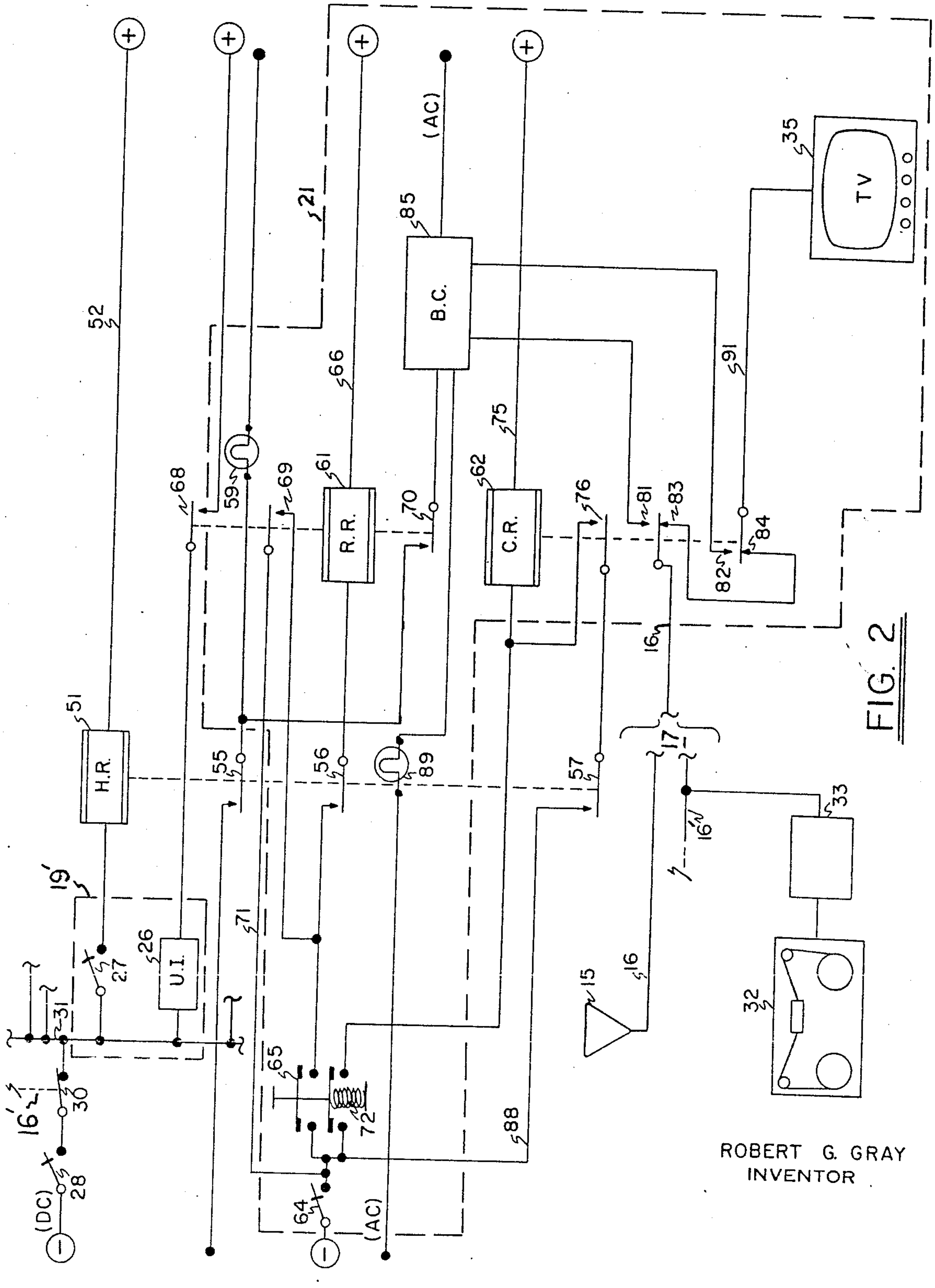
FIG. 2 is a diagram partly in schematic and partly in block form useful in understanding the invention.

FIG. 2, illustrates, in conventional circuit form, one form of Control and Indicating Unit that may be used in a Central Control and Monitoring Panel. The circuit form of the central control and indicating unit in FIG. 2, is isolated by the broken line labeled 19'.

As represented by 20, in FIG. 1, each house control and indicating unit is connected to one of the room units in the house where a TV receiver is located.

The line 201 in FIG. 1, for example, is represented as extending from the house control and indicating unit 201–C to the room 201–R to the room control (RC) unit 21. One form of room control device is shown in circuit form in FIG. 2, isolated by the broken line 21. However, it will be noted that each room is represented as including a block RC and block TV. The broken line 21 in FIG. 2, includes therein the circuitry of the block RC and a representation of the television receiver 35. The TV receiver 35 is not necessarily part of the room control device 21, but the room control device is connected to the receiver 35, at the antenna terminals of the TV receiver.

It will be noted that the lead 16, by which the TV signals are conveyed to the rooms, is connected to each block RC, the block RC being connected to the TV receiver at the antenna in part terminals thereof.

The house control and indicating unit 19, in FIG. 1, is shown with two indicators 25 and 26 and switch 27. The circuit diagram in FIG. 2 represents indicator 25 as an indicator lamp, and represents indicator 26 as block 26 with UI meaning Use Indicator. By Use Indicator it is meant that this component could be an indicating lamp, a timer, a recorder or some component which may when actuated automatically indicate and/or record when the room control unit is in use. This component may be used to record the use of the room control which would be operated or energized only to watch the closed circuit TV program and provides a basis for monitoring the watching or selection of pay-to-watch TV program presented over the closed TV system.

A master control 28 is provided so that each control and indicating unit in the central control panel may be disabled or turned-off at the same time. Each control and indicating unit is shown with a switch 27 which is used to enable or prepare or condition for actuation the room control device with which the unit is associated. If desired, means may be provided to operate or switch a plurality of switches (27) at one time to avoid operating each switch individually. The master house switch 28 may control the main powder supply to the central control panel 18. In series with the master house switch is a programmable house switch 30. The programmable house switch may be a time switch or, as represented, may be a switch that responds to a signal or pulse which may be programmed to respond to a predetermined signal generated by the close TV system. Such a signal is represented as being applied to the programmable switch via lead 16'.

Since the master house switch, 28, or the programmable house switch 30 may be operated effectively to disable all the individual room control and indicating units 19 at the same time, by opening the power supply circuit, for example, the switches 27 may be left in an "on" position so that when the switch 28 or the switch 30 are arranged to form a complete circuit, the individual room control and indicating unit switch will still be closed to thus turn "on" the individual room control device and indicate that the room control may be actuated by the guest, if so desired.

A closed circuit TV system or an in-house television signal transmission system is represented by a video tape recorder 32 which is operated when desired from the office of the house One video tape recorder that may be used is known as IVC Model 870, manufactured and sold by International Video Corporation of Sunnyvale, California and shown in an advertising brochure having a print date of Mar. 1971. The TV signal from the video tape device 32 is applied to conventional modulator 33 which provides a radio frequency (RF) carrier signal for the TV signal from the tape device 32 One modulator that may be used is known as Model 6300 MODULATOR manufactured and sold by Scientific - Atlanta, Incorporated of Atlanta, Georgia, shown and described in an advertising brochure distributed by Scientific - Atlanta, Inc.. The output of the modulator 33 (the RF carrier with the TV program signal) is applied via a coupling 17 to the lead 16. The RF signal provided by the modulator 33 is of a frequency which is outside the spectrum of frequencies normally translatable or detectable by the TV receiver and/or on a channel that will not interfere with the off-air TV signal channels picked up by the antenna 15 and fed, via line 16, to the rooms. The closed circuit TV program signal coming out of the modulator 33 is on such a channel or at such a frequency that the signal may be converted, by a TV signal or TV channel converter, to a channel or frequency which is detectable by the TV receiver 35 but on a channel or of a frequency that is not used by local broadcasting facilities.

Included in the room control device, (RC) is a television channel converter (BC). This converter may be a block converter or any other type of television channel converter, which will convert a TV signal from one channel or frequency spectrum position to another channel or frequency spectrum position. One converter that may be used is known as model CTV–3–CS SUPER BAND CONVERTER manufactured by AEL Communications Corporation, Lansdale, Pennsylvania. This converter is what is referred to as "block converter" which converts a series or block of television channels from one position in the RF spectrum to another position in the RF spectrum. The one position may be a position in the spectrum of frequencies which is outside the normal reception range of a normal TV receiver. The other position may be a position in the spectrum of frequencies somewhere in the regular 2–13 channel spectrum or any position in the spectrum of frequencies within the range of reception of a TV receiver.

It is readily apparent that the frequency of RF carrier generated by modulator 33 will be such that when the in-house or closed circuit television signal on the RF carrier is applied to the converter, the converter 85 will convert the in house signals to a frequency or channel within the normal range of reception of the receiver so that the converter signals will be detectable and/or translatable by the TV receiver. However, it should be noted that the in house channel, after being converted, is preferably on a channel which is not used by local TV broadcasting stations. This is normally referred to as a vacant channel.

Attention is now directed to FIG. 2 where the schematic of the circuit shows that the master switch 28 controls the main power supply, in series with the normally closed programmable switch 30 to a bus-terminal 31. Each house control and indicating unit 19 (19') is connected to the bus-terminal 31. This power is represented as direct current (DC) and is preferably in the 24–28 volt range.

Assuming the master switch 28 and the programmable switch 30 are each closed, the switch 27 at the panel or console may be closed at the office so that the room control device with which the particular switch 27 is associated may be conditioned to be actuated by the guest, from the room. This may also be referred to as placing the circuit of the room device in an enabling condition.

Closure of the switch 27 completes a circuit, to energize relay 51, the House Relay, from DC plus (represented by a plus in a circle) line 52, the coil of relay 51, switch 27, bus terminal 31, switch 30, switch 28 to the negative DC terminal or return (represented by a minus in a circle). Energized relay 51 closes its normally open contacts 55, 56 and 57. The closure of switch 27 also completes an illuminating circuit for indicator lamp 25, which is connected to a negative return through bus terminal 31. Indicator lamp 25 may serve to indicate that the control and indicating unit is "on" and that the room control device has been placed in condition for energization by actuation at the local level. Closure of contact 55 closes an alternating current (AC) which illuminates the indicator lamp 59. Indicator lamp 59 is located in the room and may be physically located on the room control unit. Indicator lamp 59 is employed to indicate to the guest in the room that the room control unit has been enabled or has been placed in condition for energization. When the room control device has been enabled the guest may cause the room control device to become energized by actuating the device. Energization through actuation may be accomplished at any time the indicator lamp is illuminated. Closure of the contact 55 also prepares al alternating current (AC) path for driving the converter 85.

Closure of contact 56 prepares an energizing or pull in circuit for relay 61, the room relay. Contact 56 is also in the self-holding or lock-in circuit for relay 61. Thus, actuation of the relay 61 is effectively controlled at the house level by control of relay 51, which controls a set of contacts 56 in the energizing circuit of relay 61. In addition continued energization of relay 61 is also controlled at the house level by control of the contacts 56 in the self-holding circuit.

Closure of contact 57 prepares a self-holding or lock-in circuit for relay 62, the Converter Relay. A local or room master switch 64 is provided which is operated (closed) prior to actuation of the room control unit. The room master switch 64 serves as a local room control device cut-off switch since after the room control unit has been energized the switch 64 is used to deenergize the room control unit locally.

With switch 64 closed, the button or push-contact 65 may be closed to actuate the room control device. Closure of push contact 65 completes two energizing circuits, one for relay 61 and the other for relay 62. Relay 61, the room relay, is energized via a circuit completed from DC plus through line 66, the coil of relay 61, contact 56, the upper contacts of the stack of contacts of push-cutton 65, switch 64 to the return. Energized relay 61 closes its normally open contacts 68, 69 and 70. Closure of contact 68 completes a circuit to energize or activate the Use Indicator 26 on the house control and indicator unit. The Use Indicator is held activated only while the relay 61 is held energized and the room control device is energized only when relay 61 is energized. Closure of contact 69 completes a self-holding or lock-in circuit for relay 61 through the lead 66, the coil of relay 61, contact 56, contact 69, lead 71 and switch 64 to the return. Button 65 is provided with a bias device, such as a spring 72, which causes the button to open when released. Upon release of button 65 relay 61 will remain energized through its holding or lock-in circuit; closure of contact 70 completes the prepared AC driving circuit for the converter 85. It will be seen from the circuit arrangement that the converter 85 is driven by the AC circuit under cooperation of the house controlled contacts 55 and the room relay controlled contacts 70.

The relay 62 is energized via a circuit completed from DC supply, through lead 75, the coil of relay 62, the lower contacts of the stack of contacts of button 65, and switch 64 to the return. Energized relay 62 closes its contacts 76 and 81 and 82 while it opens its contacts 83 and 84.

Closure of contact 76 by relay 62 completes a prepared holding or lock-in circuit for relay 62 completed from DC power over lead 75, through the coil of relay 62, contact 76, contact 57, lead 88 and switch 64 to the return.

The contact pairs 81/83 and 82/84 represent a double pole, double position RF switch, operated or switched by the relay 62. When relay 62 is energized, the contacts 81 and 82 are closed and all the television signals appearing in the signal distribution network lead 16 (from the open TV system and from the closed TV system) are conducted via contact 81 to the converter 85, out of the converter to contact 82 and via lead 91 to the TV receiver 35.

When relay 62 is deenergized, the contacts 83 and 84 are closed and television signals from the distribution network lead 16 are conducted through contact 83, and contact 84 to lead 91 to the TV receiver 35.

Thus it will be seen that the television signals on lead 16 may be applied to the TV receiver 35 directly through the RF switch contacts 83–84 or may be applied through contact 81, the converter 85 and through switch 82 to the receiver 35.

It will be further seen that although relay 61 requires that the relay 51 be energized before the relay 61 may be energized, energization of relay 62 lacks such requirements. Actuation of the button 65 (with switch 64 closed) will cause relay 62 to become energized and in becoming energized will reverse the condition of the RF switch contacts. Energization of relay 62 will occur when button 65 is pushed (with switch 64 closed) regardless of the condition of relays 51 and/or 61, and, in becoming energized, the RF switch 81/83 – 82/84 will become reversed. Reversal of the RF switch contacts (81–82 closed) will conduct the TV signals on lead 16 to the converter 85. However, if relay 51 and/or relay 61 are deenergized the AC power will not be applied to the converter 85 and in absence of the AC driving power the converter 85 will not actively convert TV signal then applied to the converter. Thus, in order for the converter 85 to convert TV signals applied to the converter, the AC driving power must be applied to the converter. In order to have the AC power applied to the converter both relays 51 and 61 must be energized to complete the AC driving power circuit (through closed contacts 55 and 70.) In order to have relay 61 become energized, relay 51 must be energized.

In addition with relay 51 deenergized, relay 62 will not lock-in through its holding circuit and will become deenergized when push-button 65 is released.

Thus the house maintains control over the use or energization of the room control device and operation of the converter 85.

It may be desireable to know whe AC driving power is being applied to the converter 85. To accomplish this, an indicator lamp, such as 89, may be coupled to the circuit of the converter 85 in such a way to provide power to the lamp 89 when the converter is being drived by AC. This may be accomplished with a simple conventional transformer coupling or an electro mechanical coupling internal to the converter case and driven by the AC power.

Thus it will be seen that operation of the room control is cooperative between the house and guest. The overt act on the part of the house is the closing of switch 27 of the control and monitoring unit to condition the room control device for energization. The overt act on the part of the guest is pressing the push button 65 to actuate the room control.

Control over the energization of the room control device is maintained by the house since the energizing or pull-in circuit for relay 61 the room relay may be completed only after closure of contact 56, which is under control of relay 51, the house relay. In addition, the lock-in circuits for relay 61 and relay 62 each depend upon closure of contacts 56 and 57 respectively which contacts are controlled by relay 51, the house relay.

Local control, that is within the room, is maintained by control of the local or room master switch 64 which accords a guest the opportunity to electrically disable or deenergize the room control device after it has been energized by local actuation, by opening the switch 64.

House control is maintained over each individual room control unit by control of the switch 27 associated with the particular room. Further, group control at the house level is maintained over all the room control devices by control of the master switch 28 and the programmable switch 30 which controls the power supply to the bus terminal strip 31. With relay 51, the House Relay, deenergized, relay 61, the room relay cannot become energized and with both relays 51 and 61 or relay 61 alone deenergized, the AC circuit for applying the driving AC to the converter 85, will remain open contacts 55 and/or 70, thus without AC to drive the converter the conversion function of the converter will not occur.

The video tape recorder 32 represents a means for providing a closed circuit or an in-house television program. In the alternative, the video tape recorder 32 may be removed and signals from an in-house television studio or other television camera may be applied to the modulator 33. Essentially the video tape recorder 32 represents closed circuit capability for generating a TV signal and applying, in closed circuit arrangement, the TV signal to the modulator 33. The modulator 33 provides an RF carrier that is combined with the TV signal and the output of the modulator 33 is a TV signal which is on a channel or on the spectrum of frequencies outside the range of channels or frequencies normally detected by a normal TV receiver and on a channel or in a frequency spectrum which will not interfere with the off-air TV or other signals provided by the antenna 15. The output of modulator 33 may be applied to the common TV signal distribution network lead 16 via an RF coupling represented at 17. The lead 16' is shown extending from the output of the modulator 33 and approaching the programmable switch 30. Since the lead 16' is coupled to the distribution network are applied to the programmable switch 30. It is well known that video tapes, which may be played on a video tape recorder, may include several tracks on the same tape. One track may be used for recording video, another track may be used for recording audio and the third track may be used for recording signals for cueing purposes. A signal may be recorded on the cue track to which the switch 30 is responsive. With switch 30 closed the cue signal may appear and actuate the switch 30 to an open position. The opening of switch 30 will open the return circuit for bus-terminal 31 and cause each of the House Relays (51) to become deenergized. This effectively will deenergize any or all room control devices then energized. The programmable switch 30 thus provides a means, at the central level, for programming termination of TV reception of the closed TV program at the local level, and a means for automatically switching the TV receivers in each room over the off-air, or open TV system, if such TV receiver is not already on the open TV system. The programmable switch 30, provides a means for programming presentation of a barker or introductory or lead section on the closed TV program and after presentation of the barker section of the closed TV program reception of the closed TV program may be automatically interrupted by the operated programmable switch at the TV receiver level. Interruption of reception will permit a guest to select whether or not he wishes to receive the program presented over the closed TV system, after having received information about the TV program to be shown.

In describing a typical operation of the closed TV network it should be kept in mind that an operating closed TV network may be expanded to include a plurality of closed TV systems and that each closed TV system may include more than one closed circuit TV program. If a closed TV system were to include two or more closed TV programs, each means of generating the closed circuit TV program would include its own modulator which would provide an RF carrier signal which would be different from the RF carrier signal for any other closed TV program generated on the same closed TV network. The converter used in the room control device may include selection of characteristics so that selection may be made for viewing any of a plurality of closed circuit TV programs presented over the closed TV system. Converters of this type are available on the open market.

The circuit of one form of the invention and the principles of the invention having been described, it should be understood that, although the circuit is shown in conventional circuit form, using conventional components the circuit may be made wholly or partly in solid state form using semi-conductors and/or other solid state components and circuitry.

In a description of a typical operation of the closed TV network, it is assumed that when the closed TV system is not presenting a TV program over the network, the master switch 28 at the central control is open. This insures that the individual control and indicating units 19 are "off" and that all room control devices are deenergized and disabled, and the RF switch of each room control device is in its normally closed condition, that is applying TV signal appearing on the distribution network 16 directly to the TV receiver 35.

Assume that the closed TV network is used in a motel and each room or suite has a TV receiver and a room control device connected to the TV receiver and to the TV signals distribution network of the closed TV network. Further, that each room control device is connected to an individual control and indicating unit, each of which is part of the central control and monitoring panel. Power supplied to the central control and monitoring panel is controlled by the central or house master switch with a programmable switch in series connection with the house switch. Assume that the open TV system includes an antenna array arranged to pick-up TV signals broadcast from local TV broadcasting stations. The TV signals picked up by the antenna are applied to the TV signals distribution network. Further assume that the closed TV system includes a video tape playback recorder and modulator with the modulator connected to the TV signals distribution network, the signals distribution network is also connected to the programmable switch at the central control and monitoring panel for operating the programmable switch into an open position upon occurance of a predetermined signal.

Announcement maybe made by place cards or display cards or any other means through-out the motel that a closed circuit movie will be shown on TV at a particular time and that the movie will be available for any guests to see, for which the guest will be charged a fee. Instructions on the use of the room control device are in each room, conveniently placed for a guest to see. At a prearranged time, the video tape play back recorder is turned on and a pre-recorded tape is run through the recorder. At the same time, each room control device is conditioned for energization by turning on the associated control switch 27 on the control and indicating unit 19 on the central control monitoring panel, 18. When the control switch 27 is turned on, the indicator lamp 59 on the associated room control device becomes illuminated and thereby indicates to the guest that the room control device is conditioned for actuation. The guest, following instructions from a place-card announcement, turns on the TV receiver and switches the channel selector to a predetermined vacant channel. At the same time the guest actuates the room control and the closed circuit TV program is shown on his TV receiver. When the guest actuates the room control, by pushing the actuating push button, the Use Indicator 26 at the central control and monitoring panel becomes energized and indicates that the particular room control is energized. In addition, upon actuation, the room control locks itself in an energized condition, the locking circuit including central control components and local controlled components. Further, upon actuation of the room control the converter becomes functional and the RF switch connects the TV signals distribution network to the converter and connects the TV receiver to the converter.

During the initial section of the closed circuit TV program presentation, a prepared tape is run through the video tape recorder which is, perhaps, a pre-view of the movie to be shown, or part of the movie itself or some introductory material which may precede the movie, plus information relative to the fee to be paid for watching the movie and the steps to be taken or manner in which the full movie may be seen. At the end of the introductory program, the programmable switch 30 at the central panel is opened which effectively interrupts the power flow to each control and indicating unit and deenergizes each room control device previously actuated along with deenergization of the room control device the indicator lamp 59 is extinguished. As a result of becoming deenergized the room control device switches the RF switching means so that the signals on the signals distribution network are applied directly to the TV receiver. The AC driving circuit for the converter is opened. The TV receiver is now in condition to receive TV programs over the open TV system.

After an interval of time, sufficiently long enough to insure that all room control devices previously actuated are deenergized the programmable switch 30 is closed. Closure of the programmable switch 30 then automatically conditions each room control device for energization. It may be desired, at this time, to delay the start of the movie for a short interval to give the guest sufficient time to make up his mind whether or not to select to see the closed circuit TV program or to watch an open TV system program. Let it be assumed that all guests of the motel, who wish to watch the closed circuit TV movie program, actuate their respective room control devices during the delay period.

At termination of the delay period, the closed TV system program begins at that time all those room control units which have not been actuated may be released from a stand-by condition for actuation by opening or switching off the control switch (27) in the associated control and indicating unit. Lack of actuation of the room control device is indicated by lack of energization of the Use Indicator (26) of the control and indicator unit associated with the room control device.

Energization of the Use Indicator of any control and indicator unit is an indication that the associated room control device has been actuated and closed circuit TV program is being presented over the associated TV receiver.

If now a new guest arrives and wishes to see the closed circuit TV program or a guest decides late that he wishes to see the closed circuit program, notification by the guest by a call to the desk over the house telephone, may be made and the switch 27 of the control and indicator unit associated with the room the guest is in may be closed placing the room control device of that guest in a stand-by condition for actuation. The guest may actuate the room control device and adjust the associated TV receiver to the proper channel and see the closed circuit TV program over the closed TV system.

At any time after the room control device has been actuated and energized and the switch 27 on the associated control and indicator unit remains closed, a guest may deenergize the room control device by opening the room master switch 64. This may be done effectively to switch the TV receiver from the closed TV system to the open TV system, for example, to enable the guest to watch another TV program, such as news and/or weather programmed over a local broadcasting TV station. Switching back to the closed TV system may be done by reenergizing the room control device.

This may be accomplished by closing the room master switch 64 and actuating the room control device by closure of the push button 65.

A simplified form of the invention has been shown in block diagram and described with reference thereto. A circuit diagram has been shown and described which embraces the principles of the invention. Changes in apparatus and expansion of the invention have been described and discussed for providing a more complex network. Other changes, alterations and substitutions may be made, as well be recognized by these skilled in the art, without departing from the spirit of the invention as defined in the claims.

What is claimed is:

1. A TV network including at least a first TV system and a second TV system each providing TV signals defining different TV programs respectively to a plurality of TV receivers over a common TV signal distribution network, said first TV system including;

means for picking up TV signals defining first TV programs and for applying said TV signals so picked up to said common TV signals distribution network for distributing said TV signals defining first TV programs to said TV receivers, said second TV system including, means for generating TV signals defining second TV programs, TV signal modulator means coupled to said means for generating TV signals defining second TV programs for changing said generated TV signals defining second TV programs for preventing intelligent display of the TV program defined by said generated TV signals by the said TV receivers, means for applying said changed TV signals to said common TV signal distribution network, TV signals converter means, individual to each TV receiver of said plurality of TV receivers, for changing again the said change TV signals for providing TV signals defining said second TV programs capable of being intelligently displayed by the TV receiver individual to said TV signals converter, and switch means individual to each TV receiver of said plurality of TV receivers coupled to said common TV signal distribution network and having a first position for applying TV signals received from said distribution network to the TV receiver associated with said switch means and having a second position for applying said TV signals received from said distribution network to said TV signals converter means associated with said associated TV receiver and for applying the twice changed TV signals to said associated TV receiver.

2. A TV network including at least a first TV system and a second TV system as in claim 1 and said means for picking up TV signals defining first TV programs includes;

a TV antenna for picking up TV signals and said TV signals defining first TV programs are TV signals broadcast to the general public, and said first TV programs are detectable by the TV receivers of said plurality of TV receivers.

3. A TV network including at least a first TV system and a second TV system as in claim 1 and in which said TV signal modulator means changes the frequencies at which said TV signals defining second TV programs may be received to frequencies outside the range of frequencies receivable by said receivers and said TV signals converter changes again the frequencies at which said TV signals defining second TV programs may be received to frequencies within the range of frequencies receivable by said TV receivers.

4. A TV network including at least a first TV system and a second TV system as in claim 3 and in which said TV signal modulator means includes means for generating a carrier frequency signal and means for mixing said TV signals defining second TV programs with said carrier frequency signal for providing TV signals having frequency characteristics outside the normal range of frequency response of said TV receivers, and said TV signals converter means includes;

means for generating a second carrier frequency signal and means for mixing said TV signals defining second TV programs having frequency characteristics outside the normal range of frequency response of said TV receivers with said second carrier frequency signal for providing TV signals defining second TV programs having frequency characteristics within the normal range of frequency response of said TV receivers.

5. A TV network including at least a first TV system and a second TV system as in claim 3 and in which said TV signal modulator means includes;

means for generating radio frequency signals and means for mixing said radio freuquency signals with said TV signals defining second TV programs for placing the last mentioned said TV signals in a channel outside the range of channels receivable by said TV receivers and said TV signals converter means includes means for generating second radio frequency signals, and means for mixing said TV signals defining second TV programs in a channel outside the range of channels receivable by said TV receivers with said second radio frequency for converting said TV signals defining second TV programs to a channel with the range of channels receivable by said TV receivers.

6. A TV network including at least a first TV system and a second TV system as in claim 3 (amended) and in which said TV signals modulator means includes means for generating carrier frequency signals, and means for combining said carrier frequency signals with said TV signals defining second TV programs for providing TV signals having frequency characteristics outside the range of frequency response of said TV receivers and non-interfering with said TV signals defining first TV programs, and said TV signals converter means includes, means for generating other carrier frequency signals, and means for combining said other carrier frequency signals with said TV signals outside the normal range of frequency response of said TV receivers for changing the frequency characteristics of the last mentioned TV signals to a frequency position within the range of frequency response of said TV receivers.

7. A TV network including at least a first TV system and a second TV system as in claim 1 (amended) and said switch means is normally biased to said first position and said switch means further includes actuatable means for changing said switch means from said first position to said second position.

8. A TV network including at least a first TV system and a second TV system as in claim 1 (amended) and said second TV system further includes;

a source of power for driving said TV signals converter means, and means individual to each said TV signals converter means and remotely controlled for coupling said power source to said TV signals converter means for driving said TV signals converter means.

9. A TV network including at least a first TV system and a second TV system each system for providing TV signals defining different TV programs respectively as in claim 8 and said second TV system further including;

a power source for driving said converter means, and said power source includes;

second switch means having an open position and a closed position, said closed position for applying power to said converter means and said second switch means is positioned in said closed position in reponse to operation of said remote means.

10 A TV network including at least a first TV system and a second TV system as in claim 1 (amended) and said second TV system further includes;

means individual to each said switch means for positioning said switch means in said first position or in said second position, as desired.

11. A TV network including at least a first TV system and a second TV system as in claim 10 and said second TV system further includes;

switch lock-in means individual to each said switch means for conditioning said switch means for locking-in in said second position when actuated in combination with said positioning means.

12. A TV network including at least a first TV system and a second TV system as in claim 1 (amended) and said second TV system further includes;

means individual to each said switch means and local thereto for positioning said switch means in said second position when actuated and second means individual to each switch means and remote therefrom for according lock-up of said switch means in said second position, when actuated.

13. A TV network including at least a first TV system and a second TV system as in claim 12 (amended) and said second TV system further includes;

a source of power for driving said TV signals converter means, and means individual to each said TV signals converter means and remote therefrom for coupling said power source to said TV signals converter means for driving said TV signals converter means.

14. A TV network having a controlled TV system and an uncontrolled TV system each providing TV signals defining different TV programs respectively to a plurality of TV receivers over a TV signals distribution network said TV network normally conditioned for according TV reception of TV programs by the TV receivers of said plurality of receivers from said uncontrolled TV system, said uncontrolled TV system including;

means for picking up TV signals defining first TV programs, means for coupling said pick up means to said TV signals distribution network for applying said TV signals defining first TV programs to said TV signals distribution network for distributing the last mentioned TV signals to each TV receiver of said plurality of receivers, actuatable switch means, individual to said each TV receiver, biased to a first position and having an actuatable second position, said first position for coupling the TV receiver with which said switch means is associated to said TV signals distribution network for applying TV signals so distributed by said TV signals distribution network to said associated TV receiver, and said controlled TV system including;

means for generating TV signals defining second TV programs, means for changing said TV signals defining second TV programs while preserving said second TV programs for preventing display of said second TV programs by the TV receivers, means for coupling said changing means to said TV signals distribution network for applying the changed TV signals to said TV signals distribution network, second change means individual to each said TV receiver for changing the changed TV signals for according display of second TV programs by the TV receiver associated with said second signal change means, said actuatable second position of said actuatable switch means for coupling said second signal change means to said TV signals distribution network for applying TV signals so distributed by said distribution network to said second change means and for coupling said associated TV receiver to said second signal change means for applying said twice changed TV signals to said TV receiver, and means for actuating said actuatable switch means from said first position to said actuatable second position.

15. A TV network having a controlled TV system and an uncontrolled TV system each providing TV signal defining different TV programs respectively as in claim 14 (amended) and in which said means for actuating said actuatable switch means includes;

remote switch means individual to each said actuatable switch means for preparing said actuatable switch means for locking in said actuable second position and local switch means individual to each said actuatable switch means for positioning said actuatable switch means into said second position when actuated and for locking said actuatable switch means in said second position when actuated in combination with actuation of said remote switch menas.

16. A TV network having a controlled TV system and an uncontrolled TV system each providing TV signals defining different TV programs respectively as in claim 14 (amended) and in which said means for changing said TV signals defining second TV programs includes;

means for generating RF carrier signals and means for mixing said RF carrier signals with said TV signals defining second TV programs for providing TV signals defining second TV programs having frequency characteristics outside the range of frequency response of said TV receiver and said second signal change means includes, means for generating other RF signals and means for mixing said other RF signals with said TV signals having frequency characteristics outside the range of frequency response of said TV receivers for providing TV signals defining second TV programs having frequency characteristics within the range of frequency response of said TV receivers.

17. A TV network having a controlled TV system and an uncontrolled TV system each providing TV signals defining different TV programs respectively as in claim 14 (amended) and in which said second signal change means is operable in response to actuation and said controlled TV system further includes;

remote switch means individual to each said second signal change means and remotely actuatable therefrom for conditioning said second signal change means for operation.

18. A TV network having a controlled TV system and an uncontrolled TV system each providing TV signals defining different TV programs as in claim 14 (amended) and in which said means for picking up TV signals includes, an antenna for picking up TV signals terminated over the air.

19. A TV network having a controlled TV system and an uncontrolled TV system each providing TV signals defining different TV programs as in claim 14 (amended) and in which said means for generating TV signals defining second TV programs is a video tape playback recorder.

20. A TV network having a controlled TV system and an uncontrolled TV system each providing TV signals defining different TV programs as in claim 14 (amended) and in which said means for changing said TV signals defining second TV programs is an encoder and said second signal change means is a decoder.

21. A TV network having a controlled TV system and an uncontrolled TV system each providing TV signals defining different TV programs respectively as in claim 14 (amended) and in which said means for changing said TV signals defining second TV programs includes, means for generating RF carrier signals of predeterminated frequency and means for mixing said RF carrier signals and said TV signals defining second TV programs for providing TV signals having frequency characteristics outside the range of frequency response of said TV receivers and having frequency characteristics which are non-interfering with respect to the TV signals defining first TV programs on said TV signals distribution network and said second signals change means includes means for generating other RF signals of other predetermined frequency and means for mixing said other RF signals with said TV signals having frequency characteristics outside the range of frequency responsé of said TV receivers for providing TV signals defining second TV programs having frequency characteristics within the range of frequency response of said TV receivers.

22. A TV network including at least a first TV system and a second TV system, each system for providing TV signals defining different TV programs respectively to each receiver of a plurality of TV receivers over a TV signals distribution network, said first TV system including;

means for picking up TV signals broadcast to the general public, means for coupling said pick up means to said TV signals distribution network for applying said TV signals broadcast to the general public to said TV signals distribution network, switch means individual to each TV receiver, coupled to said TV signals distribution network and having a first position for coupling said TV signals distribution network to the TV receiver with which said switch means is associated for applying TV signals to the associated TV receiver, said second TV system of said TV network including means for generating TV signals defining a TV program differing from the TV program defined by the TV signals broadcast to the general public, modulator means for modulating the TV signals generated by said generating means for preventing intelligent display of the TV program defined by the modulated TV signals by the TV receivers, means for coupling said modulator means to said TV signals distribution network for applying the modulated TV signal to said TV signals distribution network, converter means individual to each said TV receiver, for converting said modulated TV signals for according intelligent display by the associated said TV receiver of the TV program defined by the converter TV signals and, said switch means having a second position for coupling said converter means to said TV signals distribution network and for coupling said converter means to said associated TV receiver, for applying TV signals applied to said TV signals distribution network to said converter and for applying the converted TV signals to said associated TV receiver.

23. A TV network including at least a first TV system and a second TV system, each system for providing TV signals defining different TV programs respectively as in claim 22 (amended) and in which each said converter means is operable in response to a converter actuation means and said converter actuation means includes;

remote actuatable means, individual to and remote from each said converter, for ppreparing said converter for operation, and local actuatable means, individual to and local to each said converter for actuating said converter into operation when said remote actuatable means has been actuated.

24. A TV network including at least a first TV system and a second TV system, each system for providing TV signals defining different TV programs as in claim 22 and in which said second position of said switch means is a lock-in position and said switch means further includes remote means individual to and remotely actuatable for preparing said switch means for lock-in in said second position, and local means individual to and locally actuatable for positioning said switch means in said second position.

25. A closed TV network including at least an open TV system and a closed TV system, each system providing TV signals defining different TV programs respectively to a common TV signals distribution network for distributing TV signals to a plurality of TV receivers, said open TV system including;

means for picking up TV signals available to the general public defining first TV programs, means for coupling said means for picking up TV signals to said common TV signals distribution network for applying TV signals available to the general public to said common TV signals distribution network for distributing TV signals to each TV receiver of said plurality of TV receivers, switch means, individual to each TV receiver of said plurality of receivers, coupled to said common TV signals distribution network for receiving TV signals from said common TV signals distribution network and having a first position for applying the TV signals received from said common TV signals distribution network to the TV receiver with which said switch means is associated and said closed TV system including means for generating TV signals defining second TV programs, means for changing said TV signals defining second TV programs for preventing display of said TV programs by the receivers of said plurality of said TV receivers, means for coupling said means for changing to said common TV signals distribution network for applying the changed TV signals to said common TV signals distribution network for distributing said changed TV signals to each TV receiver of said plurality of TV receivers, second TV signals change means individual to each TV receiver of said plurality of TV receivers for changing again the changed TV signals for according display of said second TV programs by the associated TV receiver, said switch means having a second position for applying TV signals received from said common TV signals distribution network to the associated said second TV signals change means and for applying said changed again TV signals from said second TV signals change means to the associated TV receiver, and means for actuating said switch means from said first position to said second position when desired.

26. A closed TV network including at least an open TV system and a closed TV system as in claim 25 and in which said TV signals change means in an encoder, and said second TV signals change means is a decoder.

27. A closed TV network including at least an opened TV system and a closed TV system as in claim 25 and in which said means for changing is a modulator and said modulator changes the frequency of said TV signals defining second TV programs to a position in the frequency spectrum outside the range of the TV receivers of said plurality of TV receivers and said second TV signals change means is a converter for converting the frequency of the changed again said TV signals defining second TV programs to a position in the frequency spectrum within the range of the said TV receivers.

28. A closed TV network including at least an open TV system and a closed TV system as in claim 25 and in which said means for changing said TV signals defining second TV programs changes the channel of the TV signals defining second TV programs to a channel outside the range of channels receivable by said TV receivers and said second TV signals change means changes again the channel of said TV signals defining second TV programs to a channel within the range of channels receivable by said TV receivers.

29. A closed TV network including at least an open TV system and a closed TV system as in claim 25 and in which said switch means in said second position couples said common TV signals distribution network to the associated said second TV signals change means for applying TV signals from said common TV signals distribution network to said associated second TV signals change means and couples said associated second TV signals change means to the associated TV receiver for applying said changed again TV signals from said second TV signals change means to said associated TV receiver.

30. A TV network including at least a first TV system and a second TV system, each system providing TV signals defining different TV programs respectively over a signal distribution network to each TV receiver of a plurality of TV receivers, said first system including:

means for picking up TV signals defining first TV programs, means for coupling said pickup means to said signal distribution network for distributing TV signals defining first TV programs to said each TV receiver, switch means, individual to each said TV receiver coupled to said signal distribution network having a first position for applying TV signals appearing on said distribution network to the associated TV receiver, said second TV system including means for generating TV signals defining second TV programs, means for modulating said TV signals defining second TV programs for preventing detection of said second TV programs by said TV receivers, means for coupling said modulating means to said distribution network for applying said modulated TV signals to said network for distributing the modulated TV signals to said each TV receiver, converter means, individual to said each TV receiver for converting said modulated TV signals for according detection of said TV programs by the associated TV receiver, and said switch means having a second position for applying TV signals appearing on said signal distribution network to said converter means and for applying TV signals from said converter means to said associated TV receiver.

31. A TV network including at least a first TV system and a second TV system, each system for providing TV signals defining different TV programs respectively as in claim 30 and said second TV system further includes;

actuatable means, individual to said each TV receiver, for positioning and holding said switch means in said second position, said actuatable means including local means individual to each said actuatable means for positioning said switch means in said second position and remote means individual to each said actuatable means for conditioning said actuatable means for holding said switch means in said second position.

32. A TV network including at least a first TV system and a second TV system, each system for providing TV signals defining different TV programs respectively as in claim 30 and said second TV system further includes;

a power source for driving said converter means, and said power source includes;

second switch means having an open position and a closed position, said closed position for coupling said power source to said converter means for driving said converter means, and remotely controlled means for positioning said second switch means in said closed position.

33. A TV network including at least a first TV system and a second TV system, each for providing TV signals defining different TV programs respectively as in claim 30 and in which said switch means of said second TV system is biased in said first position and said switch means further includes;

actuatable bias control means, remotely controlled, for overcoming said bias when actuated.

34. A TV network including at least a first TV system and a second TV system each system for providing TV signals defining different TV programs respectively as in claim 30 and said second TV system further including;

converter control means, individual to each said converter means, for driving said converter means and said converter control means includes;

second switch means, remotely controlled from said converter means, having a first position and a second position, said second position for driving said converter means.

* * * * *